United States Patent [19]

Iwanaga et al.

[11] 4,104,288

[45] Aug. 1, 1978

[54] METHOD FOR PRODUCING HARD BUTTER FRACTION FROM SHEA FAT

[75] Inventors: Yukiya Iwanaga, Sennan; Hayato Kubota, Izumi, both of Japan

[73] Assignee: Fuji Oil Company, Limited, Osaka, Japan

[21] Appl. No.: 742,353

[22] Filed: Nov. 16, 1976

[30] Foreign Application Priority Data

Nov. 19, 1975 [JP] Japan .................................. 50-139539

[51] Int. Cl.$^2$ ................................................ C11B 1/10
[52] U.S. Cl. ................................ 260/412.8; 260/428.5
[58] Field of Search ............................ 260/412.8, 428.5

[56] References Cited

U.S. PATENT DOCUMENTS

| | | | |
|---|---|---|---|
| 2,505,012 | 4/1950 | Spannuth | 260/428.5 |
| 2,560,935 | 7/1951 | Dickinson | 260/412.8 |
| 2,800,492 | 7/1957 | Lambert | 260/428.5 |
| 2,898,211 | 8/1959 | Barsky | 260/428.5 |
| 3,093,480 | 6/1963 | Arnold | 260/428.5 |

*Primary Examiner*—Winston A. Douglas
*Assistant Examiner*—John F. Niebling
*Attorney, Agent, or Firm*—Wenderoth, Lind & Ponack

[57] ABSTRACT

A method for producing a hard butter fraction useful as a cacao butter substitute from a shea fat by fractionation thereof, which comprises dissolving the shea fat in a low-polar solvent: n-hexane and separating the gummy unsaponifiable substances (gums) which are precipitated at a low temperature (e.g. −30° to 5° C) to give the desired hard butter fraction, by utilizing the difference in the solubilities of the hard butter fraction and the gummy unsaponifiable substances in the solvent.

5 Claims, No Drawings

METHOD FOR PRODUCING HARD BUTTER FRACTION FROM SHEA FAT

The present invention relates to a method for the fractionation of shea fat. More particularly, it relates to a method for producing industrially a hard butter fraction from the shea fat by fractionating the shea fat with n-hexane as the solvent.

Shea fat has excellent properties for confectionery and the hard butter fraction derived from this fat solvent fractionated with a proper solvent is advantageously used as a cacao butter substitute alone or in a combination with another fat. But, the shea fat contains, as well-known hitherto, gummy unsaponifiable substances (hereinafter referred to as "gums") which are certain isoprene polymers. And if the fat is used as it is (i.e., without removal of those gums) for chocolate-making, the viscosity of the chocolate mass will be increased in the processing, and thereby, the desired tempering process is hardly performed and further the melt-in-the mouth property thereof becomes worse. Therefore, the gums are usually removed by the fractionation thereof, in which the desired hard butter fraction is separated from the raw fat. In this aspect, the solvent used for the fractionation should not only have a good efficiency for fractionation but also be able to separate the gums from the desired hard butter fraction. However, the raw fat in the shea fat and gums is easily soluble to low-polar solvents, and hence, there has hitherto been used only a medium-polar solvent, such as acetone (dielectric constant: $\delta = 21.4$ at 20° C) or methyl ethyl ketone ($\delta = 17.8$ at 17° C) for this fractionation, and the use of any low-polar solvent such as n-hexane ($\delta = 1.85$ at 20° C) has never been considered as the solvent therefor.

As the results of the present inventors' extensive studies on the process for fractionating the shea fat with low-polar solvents, it has been found that the solubilities of the desired hard butter and the gums in such a low-polar solvent as n-hexane are different under specific conditions and the desired hard butter fraction can easily be separated from the gums by utilizing the these properties. When the shea fat is fractionated by using n-hexane as the solvent, the desired hard butter fraction can be obtained in a far higher yield than in the case of fractionation with the conventional medium-polar solvents such as acetone or methyl ethyl ketone.

An object of the present invention is to provide a method for separating gums from a shea fat by the fractionation thereof.

Another object of the invention is to provide a method for effectively fractionating a shea fat by using a low-polar solvent, i.e. n-hexane.

A further object of the invention is to provide a method for producing a hard butter fraction from a shea fat.

These and other objects of the invention will be apparent from the following description.

The present invention has been accomplished on the basis of the two new findings as mentioned above, which have been experimentally proven as shown below.

Firstly, as shown by the following Experiments 1 and 2, the hard butter fraction and the gums have different solubilities in the low-polar solvents such as n-hexane under specific conditions, and by utilizing this difference, it is possible to obtain a considerably pure hard butter fraction, from which most of gums are substantially removed. In the Experiments, "part" and "%" mean part by weight and % by weight, respectively.

Experiment 1

To a crude shea fat (one part) was added an aqueous methyl ethyl ketone (hereinafter referred to as "MEK") containing 5% of water (6 parts). The mixture was warmed to 60° C and then cooled to 25° C with a mild agitation, and the supernatant was removed off by decantation. This procedure was repeated further 4 times in which fresh hydrated MEK was added to each remaining mixture to obtain purified gums (iodine value (I.V.): 256.9, saponification value (S.P.): 14.9). To the gums thus obtained (one part) was added n-hexane (50 parts) and the mixture was warmed to 50° C, by which the gums were completely dissolved to form a transparent hexane solution. This hexane solution was slowly agitated for one hour at 4° C and the insoluble materials were filtered off. The filtrate was further cooled to −25° C and agitated for one hour to form a turbid solution, which was then further filtered. By evaporating the solvent from each fraction, there were obtained the fractions as shown in Table 1.

Table 1

| Fractions | Yield (%) | I.V. |
|---|---|---|
| Crystalline portion (at 4° C) | 47.3 | 362.3 |
| Crystalline portion (at −25° C) | 3.6 | — |
| Filtrate (at −25° C) | 49.1 | 323.6 |

By analyzing these results, it is concluded that the gums contain two components, one of which is soluble in n-hexane and another one is not soluble, but the amount of insoluble component, which precipitates at 4° C to −25° C, is very small. On the basis of this fact, it is assumed that there may be obtainable a hard butter fraction including substantially no gums. Then, the fractionation of the shea fat with n-hexane was tested in comparison with the case of using MEK.

Experiment 2

(1) A deacidified and bleached shea fat (one part) was admixed with n-hexane (6 parts) and the mixture was agitated for 1 hour at 6° C and the resulting insoluble materials (the gums) were removed off by filtration. The filtrate was agitated at 3° C for 1 hour. The precipitated crystals were taken out and washed with the solvent (n-hexane, one part) which was cooled to −10° C. From each fraction the solvent was evaporated off.

(2) The shea fat (one part) used in (1) was mixed with a MEK containing 5% of water (6 parts) and the mixture was heated to 60° C, agitated for 30 minutes at 23° C and then the resulting precipitates (the gums) were filtered off. The filtrate was then agitated at 15° C for 1 hour and the precipitated crystals were collected, washed with the solvent (one part) and cooled at 10° C. From each fraction the solvent was evaporated off as in the former (1).

The data of Experiment (1) and (2) are shown in Table 2,

Table 2

| Experiments | Gums | | Crystals | | Filtrate | |
|---|---|---|---|---|---|---|
| | Yield (%) | I.V. | Yield (%) | I.V. | Yield (%) | I.V. |
| (1) with n-hexane | 4.1 | 110.3 | 40.9 | 33.3 | 55.0 | 69.0 |
| (2) with MEK | 3.8 | 256.0 | 38.7 | 36.1 | 57.5 | 64.3 |

As is clearly shown by the above results, a crystal portion having a considerably lower iodine value can be obtained when the shea fat is fractionated with n-hexane. Since the gums themself have a very high iodine value (I.V. over 300), if the crystal portion is contaminated with only a small amount of the gums, the iodine value thereof will increase markedly. Therefore, the above crystals of Experiment (1) will be substantially free of the gums.

The second finding is that the desired hard butter fraction can be obtained in a higher yield by fractionating the shea fat with n-hexane rather than by the known acetone or MEK. Experiment 3 set forth below will prove this fact. In the following experiment, there was used degummed shea fat as the starting material in order to avoid the nonclarification of the data due to mixing of the gums into the crystal portions.

Experiment 3

A deacidified and bleached shea fat (one part) was admixed with a MEK containing 5% of water (4 parts) and the mixture was warmed to 60° C. The solution thus formed was cooled to 20° C and agitated at this temperature for 30 minutes and then the insoluble gums precipitated were filtered off. The solvent was evaporated off from the filtrate to give the following degummed shea fat.

Acid value: 1.33, I.V.: 54.8, Saponification value: 181.2

The degummed shea fat thus obtained (one part) was agitated under the conditions shown in the following Table 3, and the precipitated crystals were collected by filtration, washed with a fresh solvent (one part) colder than each fractionating temperature and the solvent was evaporated off. The data are shown in Table 3.

Table 3

| Exp. No. | Solvents | Fractionating conditions | | | Crystalline portions | | Filtrates | |
|---|---|---|---|---|---|---|---|---|
| | | Solvent ratio | Temp. (° C) | Time (min.) | Yield (%) | I.V. | Yield (%) | I.V. |
| 3-1 | | 1:3 | −20 | 60 | 52.4 | 37.0 | 47.6 | 73.0 |
| 3-2 | Hexane | 1:3 | −25 | 60 | 54.8 | 37.2 | 45.7 | 73.8 |
| 3-3 | | 1:3 | −25 | 90 | 59.0 | 39.8 | 41.0 | 74.4 |
| 3-4 | | 1:4 | 12 | 60 | 41.1 | 36.8 | 58.9 | 67.5 |
| 3-5 | MEK (with 5 | 1:4 | 9.5 | 60 | 47.5 | 39.2 | 52.5 | 69.8 |
| 3-6 | % water | 1:4 | 9.0 | 60 | 53.8 | 42.1 | 46.7 | 71.0 |
| 3-7 | 99% acetone | 1:4 | 15 | 60 | 47.0 | 38.7 | 53.0 | 69.5 |
| 3-8 | | 1:4 | 10 | 60 | 52.5 | 42.8 | 47.5 | 70.7 |

The hard butter fraction obtained from shea fat mainly consists of 2-oleoyl-1,3-distearoyl-glycerides [Barrett et al., J.A.O.C.S., 40, 580(1963)] and the theoretical iodine value thereof is about 28. Therefore, if the gums are not contained, the higher I.V. (than the theoretical value) of the hard butter fraction may be due to the contamination of lower melting glycerides such as dioleoyl-stearoyl-glyceride and trioleoyl-glycerides. On the other hand, in usual hard butters used for chocolate-making, it is not preferable that they contain a large amount of the low-melting ingredients because such ingredients decrease the hardness, snaping property etc. of the chocolate obtained. The iodine value of the hard butter suitable for a cacao-butter substitute should generally be not higher than 45, preferably not higher than 40, and more preferably not higher than 37. As can be seen from the above Experiment 3, the yield of the hard butter fraction of I.V. of about 37 was 41% when conventional MEK was used (Exp. 3-4), while the yield increases to 52-54% when n-hexane was used (Exps. 3-2) as the solvent for the fractionation, respectively. Thus, the yield of the latter is 10% or more higher than that of the former. Moreover, by using n-hexane as the solvent, a crystalline portion of I.V. of 39.8 was obtained in a yield of 59% (Exp. 3—3). On the other hand, when acetone or MEK was used as the solvent, the crystalline portions of I.V. of 42-3 were obtained in a yield of about 53% (Exps. 3-6 and 3-8), and further those having an I.V. of about 39 were obtained in a yield of 47-47.5%, respectively. Thus, the fractionation yields in case of acetone and MEK are similar to each other.

As described above, we have succeeded in markedly increasing the yield of the hard butter fraction from shea fat by using n-hexane as the fractionating solvent in comparison with the case of using acetone or MEK. This may presumably be attributed to the difference in the mechanism of the crystal growth, that is, in case of n-hexane, the amount of the mother liquor conjugated in the growing crystals may be smaller than that in case of MEK or acetone. This presumption can be sustained by the following Experiment 4.

Experiment 4

To a deacidified and bleached shea fat (one part) was added a MEK containing 5% of water (3 parts) and the mixture was heated to 60° C and allowed to stand at 20° C for 30 minutes. The precipitated insoluble substances were filtered off. The solvent was evaporated off from the filtrate to give the following degummed shea fat:

Acid value: 1.15, I.V.: 55.2, Saponification value: 180.5

(1) To the above degummed shea fat (one part) was added a MEK containing 4% of water (4 parts) and the mixture was agitated at 14.5° C for 60 minutes. The precipitated crystals were collected by filtration and washed with the solvent (one part) being cooled at 10° C and weighed immediately. The crystal portion was further subjected to desolventing and weighed to measure the remaining fat. As the result, there can be calculated the weight of real fatty components in the crystalline cake.

(2) To a degummed shea fat (one part) was added n-hexane (4 parts) and the mixture was agitated at 20° C for 60 minutes. The precipitated crystals were collected by filtration and washed with the same solvent (one part) cooled to −10° C. Then, the fatty components in the crystalline cake were calculated in the same manner as in (1). The data are shown in Table 4:

Table 4

| Solvents | Yield of crystalline fraction (desolvented fat) (%) | Fatty content in the crystalline cake (%) |
|---|---|---|
| MEK (1) | 38.6 | 27.3 |
| n-Hexane (2) | 39.2 | 38.5 |

As shown in the above table, the fatty content in the crystalline cake was 38.5% in the case where n-hexane was used as the solvent, while it decreased down to 27.3% in the case where MEK was used. Thus, the latter case was about 10% lower than the former case. Accordingly, in order to obtain an equal amount of the crystalline fractions (in this experiment it was 38.6 and 39.2%, respectively) from the same degummed shea fat, the amount of the crystalline cake to be washed is larger in case of MEK than that in case of n-hexane. This means that the amount of the mother liquor being conjugated into the crystalline cake is larger in case of MEK than that in case of n-hexane, and the contamination rate of the lower-melting portion into the former crystals is more than that of the latter.

Furthermore, as is shown in the Experiment 1, a slight amount of gums may possibly remain even in the hard butter fraction obtained by the present n-hexane-fractionaton, but according to the following Experiment 5, it is made clear that such mixing is negligible for the actual processes of chocolate-making since the product had few differences in the viscosity compared with the product free from the gums. Indeed, when a chocolate was prepared by using such slightly impure hard butter, there could be found neither an abnormality nor inferiority during the processes of the chocolate-making or in the quality of the resulting chocolate.

Experiment 5

Both the crystalline portions obtained by Experiment 2 (by n-hexane- or MEK-fractionation) were compared with each other on their viscosity. As the control, a gum-containing crystalline portion obtained as shown below was also compared therewith.

A deacidified and bleached shea fat (one part) was mixed with a MEK containing 5% of water (4 parts), and agitated at 15° C for 1 hour. The crystals thus precipitated were collected by filtration, washed with one part of the solvent and then the solvent was evaporated off to give a crystalline portion of I.V. of 53.5 in a yield of 43.5%.

The results are shown in Table 4.

Table 4

| Fractions | Yields (%) | I.V. | Viscosity[1] (cp.) |
|---|---|---|---|
| n-hexane fraction (Exp. 2) (A) | 40.9 | 33.8 | 59.3 |
| MEK-fraction (Exp. 2) (B) | 38.7 | 46.1 | 59.1 |
| Gum-containing fraction (C) | 43.5 | 53.5 | 141.5[2] |

[Remarks]:
[1]Measurement of the viscosity: well-dehydrated sample was put into a BL adaptor of a B-type Rotary Viscosimeter made by Tokyo Keiki Seisakusho, Tokyo, Japan, at 60° C and then dipped into an aqueous thermostat being controlled to 35° C and measured at 6 r.p.m. The viscosity at 35° C was calculated by multiplying the indication with a predetermined multiple when the indication became constant.
[2]The viscosity was measured by No. 1 Rotor at 30 r.p.m. instead of BL adaptor, since the measurement by BL adaptor was impossible because of its high viscosity.

Then, three chocolate samples were made by using the above three fractions according to a usual manner (cf. Example 3, hereinafter), respectively, and were compared with respect to the organoleptic properties, such as snapping property and melt-in-the mouth property with 10 panel members who were well-trained, as well as to the state of the tempering during their preparation. As the results, no difference could be seen between the samples from A and B, but the sample from C showed a remarkable increase in the viscosity during tempering and further sample chocolate (C) was bad in the separation from the molds and melt-in-the mouth properties.

As is explained above, the present invention has been accomplished based on the novel findings that not only n-hexane, which has hitherto been regarded as improper as the solvent for fractionating shea fat, has an unexpectedly excellent degumming property as like as the known acetone or MEK under specific conditions but also the yield of the desired hard butter fraction can markedly be increased.

The method of the present invention may be carried out by the following steps:

(a) one part by weight of the starting shea fat is dissolved in 2 to 10 parts by weight of n-hexane with warming (e.g. at 35° to 40° C), (b) the solution thus obtained is kept at a low temperature and the precipitated insoluble materials (gums), which are usually in an amount of 2 to 7% by weight on the basis of the weight of the starting shea fat, are removed off by filtration or centrifugation and (c) the resulting filtrate or supernatant is further cooled and the precipitated crystalline portion (the desired hard butter fraction) is collected by filtration, by which the desired hard butter fraction can be obtained in a yield of about 70% by weight or lower on the basis of the weight of the starting shea fat.

In the above step (b), the temperature for keeping the solution may vary with various factors, such as the kind of the starting shea fat (e.g. the producing district, the period of crop, contents of fat and gums, etc.), the time for keeping, the amount of the solvent or the like, but is usually in a range of 4° to 13° C, preferably 5° to 10° C, more preferably 5° to 8° C. The keeping time may usually be 30 minutes to 3 hours. The temperature for cooling in the step (c) may also vary with the various factors as mentioned above, but is usually in a range of −30° to 5° C, preferably −25° to 1° C, more preferably −20° to 0° C. The cooling time may usually be 30 minutes to 1.5 hours.

Alternatively, the present method may be carried out by the followng steps:

(a') one part by weight of the starting shea fat is dissolved in 2 to 10 parts by weight of n-hexane as in the above process, (b') the solution thus obtained is kept at a lower temperature and thereby the gums as well as the desired hard butter fraction are precipitated and separated by filtration or centrifugation, and (c') to the precipitates thus obtained is added an appropriate amount of n-hexane so as to make the fatty content in the mixture to 10 to 40% by weight, and the resulting mixture is kept at a higher temperature than that in the above lower temperature for the precipitation, by which the insoluble materials (the gums) in an amount of 2 to 7% by weight on the basis of the weight of the starting shea fat are precipitated and then separated by filtration or centrifugation to give the desired hard butter fraction in a yield of about 70% by weight or lower.

In the above step (b'), the temperature for keeping the solution may also vary with various factors as mentioned above, but is usually in a range of −30° to 5° C, preferably −25° to 1° C, more preferably −20° to 0° C. The keeping time may usually be 30 minutes to 1.5 hours. The temperature for keeping the mixture in the step (c') may also vary with various factors as mentioned above, but is usually in a range of 4° to 25° C, preferably 10° to 20° C, more preferably 12° to 16° C. The keeping time may usually be 30 minutes to 1.5 hours.

Alternatively, the mixture of the gums and the desired hard butter fraction obtained in the above step (b') may be dissolved in n-hexane with warming (e.g. at 40° to 45° C), and the resulting solution is kept at a low temperature, for example, at 5° to 20° C, preferably 8° to 15° C, and thereby the insoluble gums are precipitated. When the precipitated gums in an amount of 2 to 7% by weight on the basis of the weight of the starting shea fat are removed off by filtration or centrifugation, the desired hard butter fraction is obtained in a yield of about 70% by weight or lower.

The gist of this invention can be further summarized by the following formula showing material balance, wherein the letters: X, Y, Z and S represent the hard butter fraction, the liquid oil fraction (oils other than the hard butter fraction in the shea fat), the gums and the starting shea fat, and letters in the parentheses: b, c, b' and c' represent the above process, respectively. The numerals show the amount of each component (%) by weight), when the amount of the starting fat is supposed to be 100%.

$$X + Y + Z = S\ (100)$$
$$S - Z = (X + Y) \quad (b)$$
$$(100)(2-7) \quad (98-93)$$
$$(X + Y) - Y = X \quad (c)$$
$$(98-93) \quad (\leq 70)$$

or $$S - Y = (X + Z) \quad (b')$$
$$(100)$$
$$(X + Z) - Z = X \quad (c')$$
$$(2-7)(\leq 70)$$

Therefore, it is clear that Y is not less than 23–28% by weight and (X + Z) is not more than 72–77% by weight.

The n-hexane, which is used as the solvent, is not necessary to be pure and so-called "hexane" described in official books for food additives (generally contains about 60% by weight of n-hexane and about 40% by weight of other $C_6$-alkane isomers) may also be used. The amount of such solvent to be used is preferably 2–10 parts by weight to the raw shea fat. If the amount is less than 2 parts by weight, the efficiency of the fractionation will be lowered, while if the amount is over 10 parts by weight, it is not preferable from the economical viewpoint. The temperature for precipitating the gums of 2–7% by weight in the step (b) is variable with the various factors as mentioned above, and the most suitable temperature will be determined by the quality of the raw shea fat, the solvent ratio or the like. For instance, when the solvent ratio is 1:6, the preferable temperature is about 6° C. In the step (c), the desired hard butter fraction is collected by filtration or centrifugation from the crystalline suspension formed by cooling the filtrate or the supernatant obtained by the prior step (b). The most suitable cooling temperature should also be determined under taking into consideration various factors, e.g. the quality of the fractionated product (the hard butter) and its yield or the like. But too low a temperature, e.g. that at which over 70% by weight of the crystalline fraction will be precipitated, is not preferred because of the lower quality of the product.

In the step (c'), the fresh solvent to be added to the mixture of the hard butter fraction and the gums should be sufficiently cooled so that the crystals are not dissolved therein. The resulting mixture is warmed to a temperature, at which the fat (glycerides) is dissolved but the gums are not dissolved, wherein the gums and the hard butter fraction are separated from each other by utilizing the difference of the solubilities thereof in the solvent.

When the crystalline mixture is dissolved in n-hexane in any step of the above processes, the solvent is preferably used so as to form 40–10% by weight of the fatty content in the mixture. If the fatty content becomes over 40% by weight owing to the less amount of the solvent, the separation of the gums from the glyceride portion becomes difficult. On the other hand, if the fatty content is less than 10% by weight, it is uneconomical. The temperature for keeping the mixture in the step (c') may also be varied depending on the fatty content of the produced fat-gum mixture but when the fatty content is 14% by weight, 14° C is satisfactory because, at this temperature, it is possible to dissolve the desired fat without dissolving the gums. This gummy substance can be removed off from the liquid phase by filtration or centrifugation. After removing the gums, the solvent is evaporated off from the remaining liquid to give the hard butter fraction. Agitation is advantageously applied for saving time in the cooling step and for promoting the growth of the crystals.

According to the present invention, the desired hard butter fraction can be produced in a markedly higher yield as compared with the known method. The present invention has another advantage in that the recovery of the solvent can be significantly simplified and further its recovering yield is much higher. Namely, the lower aliphatic ketone solvents used hitherto were inconvenient in the necessary dehydration process since these solvents generally dissolve a large amount of water. (Acetone is freely miscible with water, MEK (one part by weight) dissolves 4 parts by weight of water). The latter forms an azeotropic mixture having b.p. of 73.4° C which contains 11.3% by weight of water). Thus, the conventional method is troublesome in the recovery of the solvent and further the loss of the solvent is large. On the contrary, n-hexane is insoluble in water and easily separates from water only by being allowed to stand with the recovered solvent. This fact makes the treatment and apparatus for the recovery of the solvent much simplify and further decreases the losses. This is another advantage of the invention.

The present invention is illustrated by the following examples, but is not limited thereto.

EXAMPLE 1

One part by weight of a deacidified and bleached shea fat was mixed with 6 parts by weight of an industrial n-hexane. The mixture was agitated at 6.5° C for 90 minutes and filtered to remove 4.5% by weight of the crystals of I.V. of 112.3 (including the gums). The filtrate was further agitated at 0° C for 60 minutes and the precipitated crystals thus formed were washed with one part by weight of the solvent cooled at −10° C. The solvent was evaporated off from the crystals to give a hard butter fraction of I.V. of 36.3 in a yield of 45.3%.

EXAMPLE 2

One part by weight of a shea fat (deacidified and bleached) was mixed with 4 parts by weight of an industrial hexane and the mixture was agitated for 60 minutes at 0.5° C. The precipitated crystals thus formed were washed twice with 0.7 part by weight of the solvent cooled at −10° C. To the crystals was added a fresh solvent cooled at 10° C so that the fatty content in the mixture reached to 14% by weight and the crystalline suspension was further agitated slowly for 35 minutes at 14° C. The insoluble crystalline portion which remained was then filtered off. The solvent was evaporated off to give a hard butter fraction of I.V. of 37.8 in a yield of 43.5%.

EXAMPLE 3

To 500 g of a deacidified and bleached shea fat was added 3000 g of an industrial hexane, and the mixture was agitated at 6.5° C for 150 minutes to give 28 g of gummy crystals of I.V. of 95.6 which were then removed by filtration. The filtrate was further cooled to −5° C and kept for about 60 minutes with a slow agitation. The crystals thus precipitated were then dispersed into 400 g of the solvent being cooled to −15° C and immediately collected by filtration. This procedure was repeated three times and then the solvent was removed off from the crystals to give 210 g of a hard butter fraction of I.V. of 38.3.

Chocolate-making test 600 g of a deacidified and bleached palm oil were admixed with 2400 g of an industrial n-hexane and the mixture was agitated at 0° C for 60 minutes to remove high-melting crystals of I.V. of 15.3. (Yield: 66 g). The filtrate was cooled to −15° C and maintained at this temperature for 60 minutes with agitation. The crystals thus obtained were then mixed with 500 g of the solvent cooled at −30° C to form a dispersion and then immediately filtered. This washing operation was repeated twice and the solvent was evaporated off. Thus, there were obtained 163 g of a mid-fraction of palm oil having an I.V. of 36.0. This mid-fraction was mixed with the hard butter fraction according to Example 3. This mixture was then bleached and deodorized as usual.

Composition of the chocolate sample

| | |
|---|---|
| Cacao mass | 225 g |
| Full-fat milk powder | 345 g |
| Pulverized sugar | 555 g |
| Hard butter | 307.5 g |
| Cacao butter | 67.5 g |
| Lecithin | 10.5 g |

1200 g of the mixture after being conched was put into an enameled vat, the bottom of which was dipped in a depth of about 1 cm into a water-bath held at 15° C and the mixture was agitated well. When the temperature of the composition reached to about 28° C, the temperature of the bath was also raised to 28° C, and the agitation was further continued for 15 minutes. Thereafter, the mixture was poured into molds and finally cooled in a refrigerator for 30 minutes.

As the results, there could be found no trouble, particularly in the tempering process, throughout the processes. Any abnormal viscosity-rising in the tempering operation was not seen and the molding was successfully carried out under normal viscosity. Moreover, the separation from the molds and gloss of the product were entirely satisfactory and the resultant sample was estimated to be a good chocolate.

What is claimed is:

1. A method for producing a hard butter fraction from a shea fat by fractionation thereof, which comprises dissolving the shea fat in n-hexane, maintaining the resulting solution at a temperature of 5° to 10° C to precipitate the gummy unsaponifiable substances in the shea fat, separating the precipitated gummy unsaponifiable substances, cooling the solution obtained after the separation of the gummy substances at a temperature of 25° to 10° C, and collecting the precipitated hard butter fraction.

2. A method for producing a hard butter fraction from a shea fat by fractionation thereof, which comprises dissolving the shea fat in n-hexane, maintaining the resulting solution at a temperature of −30° to 5° C, separating the resulting crystalline precipitates, adding n-hexane to the separated crystalline precipitates so as to make the fatty content in the mixture to 10 to 40% by weight, keeping the resulting mixture at a temperature of 4° to 25° C, and separating the precipitated gummy unsaponifiable substances.

3. The method according to claim 2, wherein the temperature for maintaining the solution is in the range of −25° to 1° C, and the temperature for maintaining the mixture is in the range of 10° to 20° C.

4. A method for producing a hard butter fraction from a shea fat by fractionation thereof, which comprises dissolving the shea fat in n-hexane, maintaining the resulting solution at a temperature of −30° to 5° C, separating the resulting crystalline precipitates, dissolving the separated crystalline precipitates in n-hexane, maintaining the resulting solution at a temperature of 5° to 20° C, and separating the precipitated gummy unsaponifiable substances.

5. The method according to claim 4, wherein the former temperature for maintaining the solution is in the range of −25° to 1° C and the latter temperature for maintaining the solution is in the range of 8° to 15° C.

* * * * *